(12) United States Patent
Wallrafen

(10) Patent No.: US 10,612,941 B2
(45) Date of Patent: Apr. 7, 2020

(54) SENSOR FOR DETECTING A POSITION OF AN ACTUATOR

(71) Applicant: Continental Automotive GmbH, Hannover (DE)

(72) Inventor: Werner Wallrafen, Hattersheim (DE)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 160 days.

(21) Appl. No.: 15/108,865

(22) PCT Filed: Jul. 1, 2015

(86) PCT No.: PCT/EP2015/064960
§ 371 (c)(1),
(2) Date: Jun. 29, 2016

(87) PCT Pub. No.: WO2016/001291
PCT Pub. Date: Jan. 7, 2016

(65) Prior Publication Data
US 2017/0108352 A1   Apr. 20, 2017

(30) Foreign Application Priority Data

Jul. 2, 2014   (DE) .................. 10 2014 212 795

(51) Int. Cl.
*G01D 21/00* (2006.01)
*G01D 5/14* (2006.01)

(52) U.S. Cl.
CPC ............... *G01D 5/14* (2013.01); *G01D 21/00* (2013.01)

(58) Field of Classification Search
CPC ........ G01R 17/00; G01R 17/10; G01R 17/12; G01R 17/14; G01R 17/16; G01R 27/2629
See application file for complete search history.

(56) References Cited

U.S. PATENT DOCUMENTS

| 5,389,864 A | 2/1995 | Tryan et al. ............... 318/562 |
| 5,486,759 A | 1/1996 | Seiler et al. ............... 324/207.2 |

(Continued)

FOREIGN PATENT DOCUMENTS

| DE | 19946917 A1 | 4/2001 | ............... G01D 5/48 |
| DE | 19947698 A1 | 5/2001 | ............. G01D 21/00 |

(Continued)

OTHER PUBLICATIONS

German Office Action, Application No. 102014212795.5, 5 pages, dated Mar. 20, 2015.

(Continued)

*Primary Examiner* — Tung X Nguyen
(74) *Attorney, Agent, or Firm* — Slayden Grubert Beard PLLC

(57) ABSTRACT

The present disclosure relates to sensors in general, and more specifically a sensor for detecting the position of an actuator. In some embodiments, a position sensor for detecting a position of an actuator with an electric motor may include: an evaluation circuit; a rectifier circuit; and additional filter components. The evaluation circuit, the rectifier circuit, and the additional filter components may be combined into an integrated circuit disposed in an IC housing. Electrical energy for operation of the position sensor may be drawn via control lines for the electric motor, rectified by the rectifier circuit, and filtered by the additional filter components.

20 Claims, 4 Drawing Sheets

(56) References Cited

U.S. PATENT DOCUMENTS

| | | | | |
|---|---|---|---|---|
| 5,545,961 A | * | 8/1996 | Peter | H02H 1/06 |
| | | | | 318/146 |
| 6,081,084 A | * | 6/2000 | Crecelius | H02J 7/1492 |
| | | | | 318/145 |
| 6,343,744 B1 | | 2/2002 | Shibata et al. | 235/492 |
| 6,472,884 B1 | | 10/2002 | Brockhaus | 324/539 |
| 6,545,441 B1 | | 4/2003 | Grady | 318/666 |
| 2004/0212318 A1 | * | 10/2004 | Hamamoto | H05B 41/2985 |
| | | | | 315/200 R |
| 2007/0125161 A1 | | 6/2007 | Bryzek et al. | 73/146.4 |
| 2011/0201906 A1 | | 8/2011 | Samuelsson | 600/301 |

FOREIGN PATENT DOCUMENTS

| | | | | |
|---|---|---|---|---|
| EP | 0593925 A1 | 4/1994 | | G01D 5/14 |
| JP | 627374 A | 1/1987 | | H02J 1/00 |
| JP | 2000306066 A | 11/2000 | | G06K 17/00 |
| WO | 2016/001291 A1 | 1/1916 | | G01D 21/00 |

OTHER PUBLICATIONS

International Search Report and Written Opinion, Application No. PCT/EP2015/064960, 11 pages, dated Sep. 14, 2015.

Japanese Office Action, Application No. 2016549291, 4 pages, dated Jul. 5, 2017.

German Office Action, Application No. 102014212795.5, 5 pages, dated Nov. 29, 2019.

* cited by examiner

SENSOR FOR DETECTING A POSITION OF AN ACTUATOR

CROSS-REFERENCE TO RELATED APPLICATIONS

This application is a U.S. National Stage Application of International Application No. PCT/EP2015/064960 filed Jul. 1, 2015, which designates the United States of America, and claims priority to DE Application No. 10 2014 212 795.5 filed Jul. 2, 2014, the contents of which are hereby incorporated by reference in their entirety.

TECHNICAL FIELD

The present disclosure relates to sensors in general, and more specifically a sensor for detecting the position of an actuator.

BACKGROUND

Active electronic position sensors are used for a wide variety of purposes, for example, for feedback for control loops noting the position of valves or tailgates in motor vehicles. Such valves and tailgates are driven by an electric motor and their position is detected. The combined assemblies form an actuator. A control unit connected via feed lines, for example, a motor electronic control unit (ECU), controls the electric motor, which, for example, operates an actuating element, the change of position of which is detected by a position sensor via a gear. For operating this position sensor, a supply voltage is required.

In the related art, active position sensors for position detection or position regulation of actuators are supplied with electrical energy (generally voltage) via separate feed lines. There are various output signals for transmitting the actuator position. The known analog interface is ratiometrically proportional to the supply voltage. The supply voltage which is generated as a reference in the control unit must therefore also be connected directly to the position sensor. Supply-voltage-independent (non-ratiometric) output signals of position sensors behave differently. Here, the supply voltage does not necessarily have to be supplied from the control unit if the sensor is able to be supplied with energy in a different manner. However, the problem still exists that a supply voltage which is separate from the motor, for example, of 5 V, must be supplied to the position sensors via separate feed lines. This also applies to the newly introduced digital signal transmission of the position, where, for example, a digital serial SENT protocol is used for a point-to-point connection (no bus).

It is obvious that the arrangement of such separate feed lines is complex.

From U.S. Pat. No. 5,389,864, a position sensor is known. For this known sensor, the electrical energy for the operation of the position sensor designed as a potentiometer is drawn via the control lines of the motor terminals.

An actuator system having a corresponding arrangement of the power supply of the position sensor is known from U.S. Pat. No. 6,545,441 B1.

Furthermore, DE 199 46 917 A1 describes a proximity sensor in which the entire functionality of the sensor is combined in one single integrated component (IC), wherein this is merely supplemented by a power supply for use.

SUMMARY

The teachings of the present disclosure provide a position sensor of the type described, but characterized by a particularly simple structure.

Some embodiments include a position sensor for detecting a position of an actuator with an electric motor which is controlled by a control unit. The electrical energy for the operation of the position sensor is drawn via the control lines of the motor terminals. For rectification and filtering of the voltage of the motor terminals, a rectifier circuit (6) and additional filter components are combined with the evaluation circuit of the position sensor (10) into an integrated circuit, which is integrated into an IC housing (2) of the position sensor (10) with the evaluation circuit.

In some embodiments, a storage capacitor (11) is combined with the evaluation circuit into the integrated circuit.

In some embodiments, a voltage regulator (9) is combined with the evaluation circuit into an integrated circuit.

In some embodiments, the voltage regulator (9) is integrated into the IC housing (2) of the position sensor.

In some embodiments, a storage capacitor (11) is connected outside the integrated circuit.

In some embodiments, a shared ground exists for a bridge circuit of the motor control and the signal evaluation.

In some embodiments, the output signals remain independent within an established range of the supply voltage of the position sensor (9).

In some embodiments, the rectifier circuit (6) comprises a bridge circuit.

In some embodiments, the rectifier circuit (6) comprises a half bridge.

In some embodiments, the rectifier circuit (6) is made up of active transistors.

BRIEF DESCRIPTION OF THE DRAWINGS

The present invention will be described in detail below based on exemplary embodiments in connection with the drawings.

DETAILED DESCRIPTION

According to the teachings of the present disclosure, separate feed lines, via which the position sensor is supplied with a separate supply voltage, are omitted. Instead, embodiments of the present teaching also use the control lines or supply lines of the motor of the provided control unit, which are present in any case, for supplying the position sensor with electrical energy. Additional lines may therefore be omitted.

In some embodiments, a rectifier circuit is combined with the evaluation circuit of the position sensor into an integrated circuit. The integration of the rectifier circuit offers the advantage that an economical solution is obtained and a significantly more reliable and more robust design is provided in comparison with printed circuit boards. In addition, this integrated approach is significantly smaller in terms of installation space. In this case, the rectifier circuit is integrated into the IC housing of the position sensor with the evaluation circuit.

In some embodiments, additional filter components are also combined with the evaluation circuit of the position sensor. For example, a voltage regulator may be also combined with the evaluation circuit into an integrated circuit. A storage capacitor may be combined into the integrated circuit, or may also be connected outside of the integrated circuit if it cannot be integrated for reasons of installation space.

In some embodiments, a voltage regulator may be downstream from the rectifier circuit, which may also be accommodated in the integrated circuit of the position sensor. The additional filter components may be integrated into the IC housing of the position sensor with the evaluation circuit. The rectifier circuit may comprise a bridge circuit, including diodes. In one particular specific embodiment, a half bridge is used.

Furthermore, the rectifier circuit may also be made up of active transistors. In this case, a smaller voltage drop results. In some embodiments, the output signals remain independent of the supply voltage of the position sensor within an established range.

Some embodiments include a position sensor, whose electrical energy for its operation is drawn from the control unit via the motor terminals of the control line of the motor. A rectifier circuit for generating a filtered DC voltage is situated downstream from the tap of the motor terminals of the control line of the control unit, which supplies the position sensor with a sufficient voltage. This rectifier voltage is combined with the evaluation circuit of the position sensor into an integrated circuit.

Figure 1:
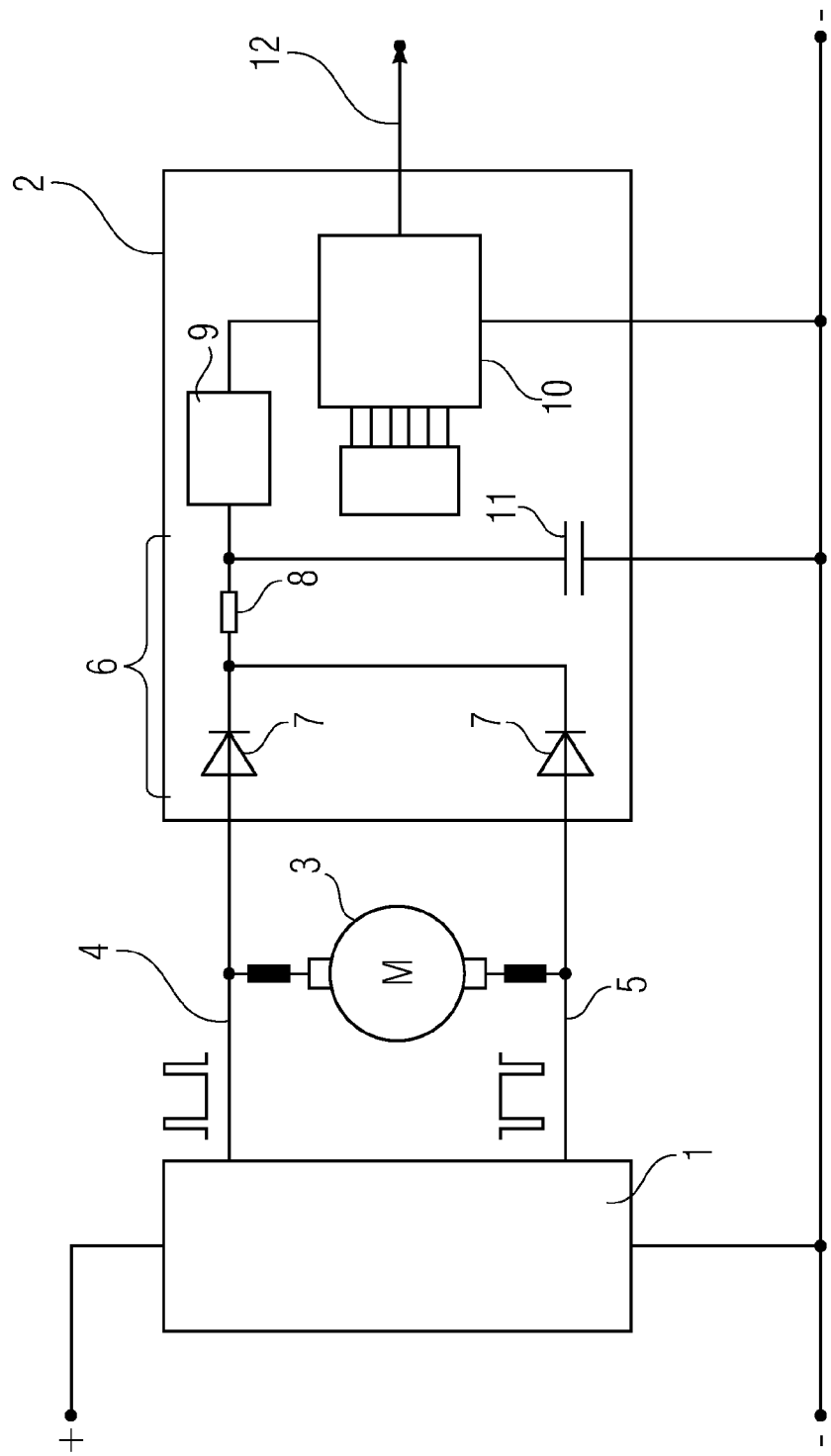
FIG. 1 shows a block diagram of a first specific embodiment of an actuator with a control unit and a position sensor.

FIG. 1 shows a block diagram of an example actuator controlled by a control unit (ECU) 1 supplied with voltage. The actuator has an electric motor 3 which actuates an actuating element, which is not shown here, whose position or change in position is detected by a position sensor 10. The corresponding position or change in position is supplied by the position sensor 10 to the control unit 1 in the form of electric signals via an output line 12.

The electric motor 3 is supplied with pulsed voltage via the lines 4, 5 of the control unit 1. Furthermore, the supply of the motor 3 is used to operate the position sensor 10 with electrical energy (DC voltage), so that separate feed lines for the operation of the sensor 10 may be omitted. Specifically, a rectifier circuit 6 including a series resistor 8, a storage capacitor 11, and a voltage regulator 9 is provided downstream from the tap of the motor terminals. As a result, a filtered DC voltage is generated, which supplies the electronic position sensor 10 with a sufficient voltage.

In the specific embodiment depicted in FIG. 1, the rectifier circuit 6 has a bridge circuit in the form of a half bridge with diodes 7. Here, it is provided that at least one terminal supplies a positive voltage at periodic intervals, and a shared ground exists for the bridge circuit and the signal evaluation. The terminals of the control voltage for the operation of the motor 3 are connected in such a way that at least one of the two motor terminals is connected to a positive voltage during motor idling and/or during motor braking.

In this case, the rectifier circuit 6 including a series resistor 8, a storage capacitor, and a voltage regulator 9 is integrated into the same IC housing in which the position sensor 10 with the evaluation circuit is situated. In this way, an economical approach is provided which results in a particularly reliable and robust design. In addition, this approach including an integrated rectifier circuit requires particularly little installation space.

Figure 2:
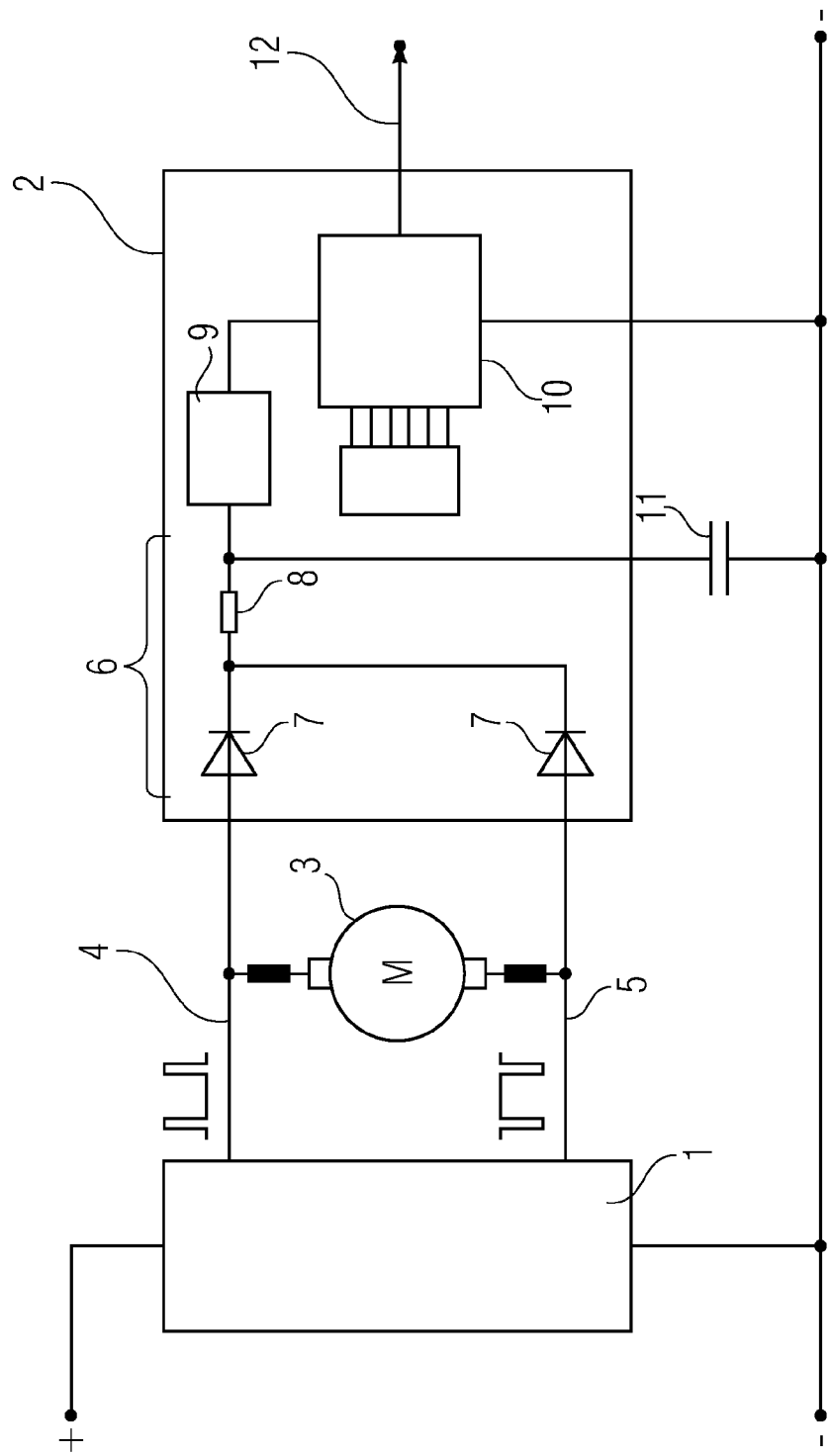
FIG. 2 shows a block diagram of a second specific embodiment of an actuator with a control unit and a position sensor.

The specific embodiment of FIG. 2 differs from that of FIG. 1 essentially in that in this case, the storage capacitor 11 is not integrated into the IC housing 2, but rather is externally connected. This approach is implemented if it is not possible to integrate the capacitor for reasons of installation space.

In the two specific embodiments of FIGS. 1 and 2, the rectifier circuit 6 is designed as a half-bridge rectifier, wherein a separate ground line is supplied for the sensor supply.

Instead of the two diodes 7 in the specific embodiments of FIGS. 1 and 2, two voltage regulators may be used, which perform the same task.

Figure 3:
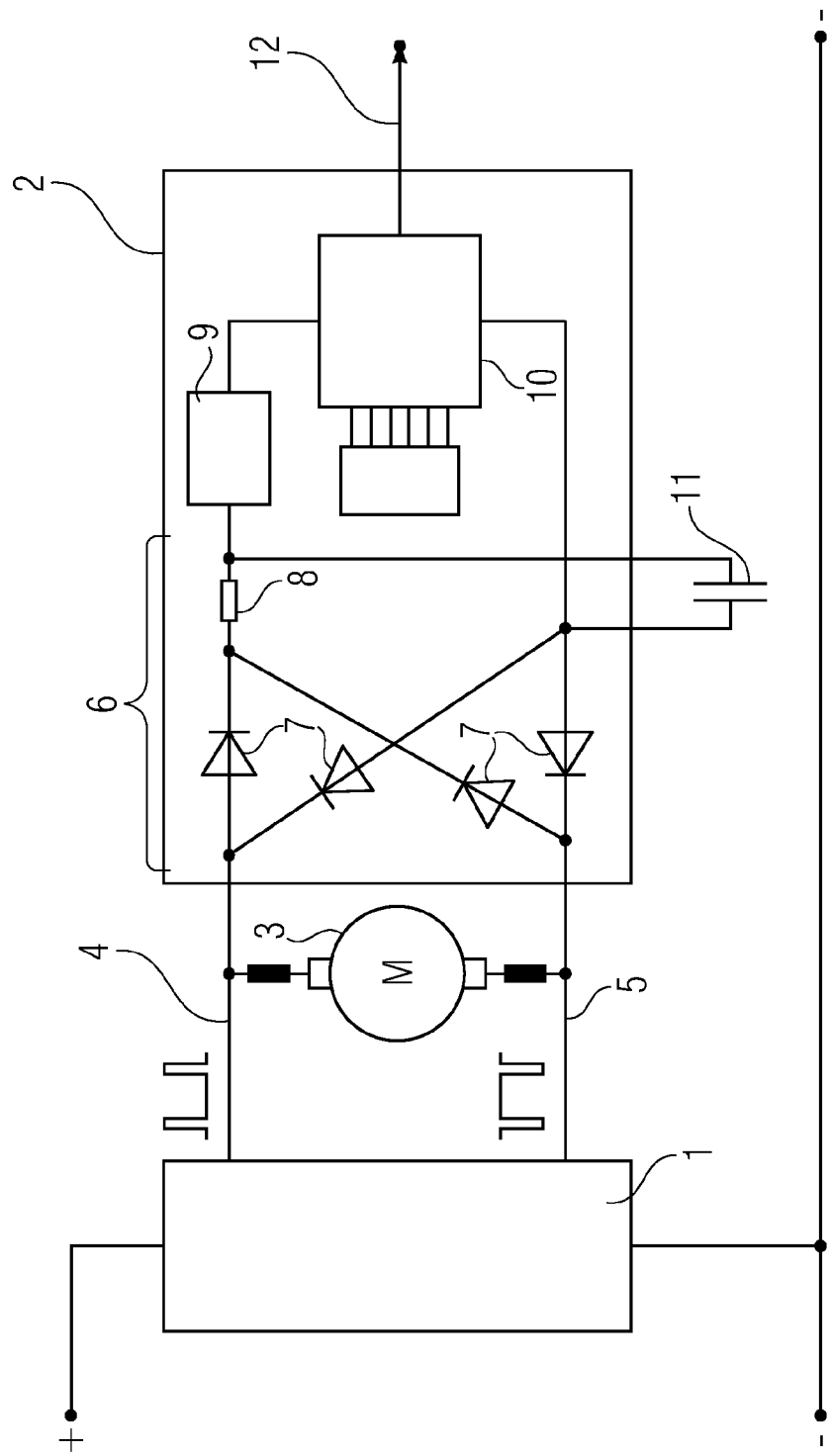
FIG. 3 shows a block diagram of a third specific embodiment of an actuator with a control unit and a position sensor.

The specific embodiment depicted in FIG. 3 shows an approach in which the rectifier circuit 6 is designed as a full-bridge rectifier, which makes it possible to supply the sensor 10 without a separate ground line. In this case, the storage capacitor 11 is connected externally.

Figure 4:
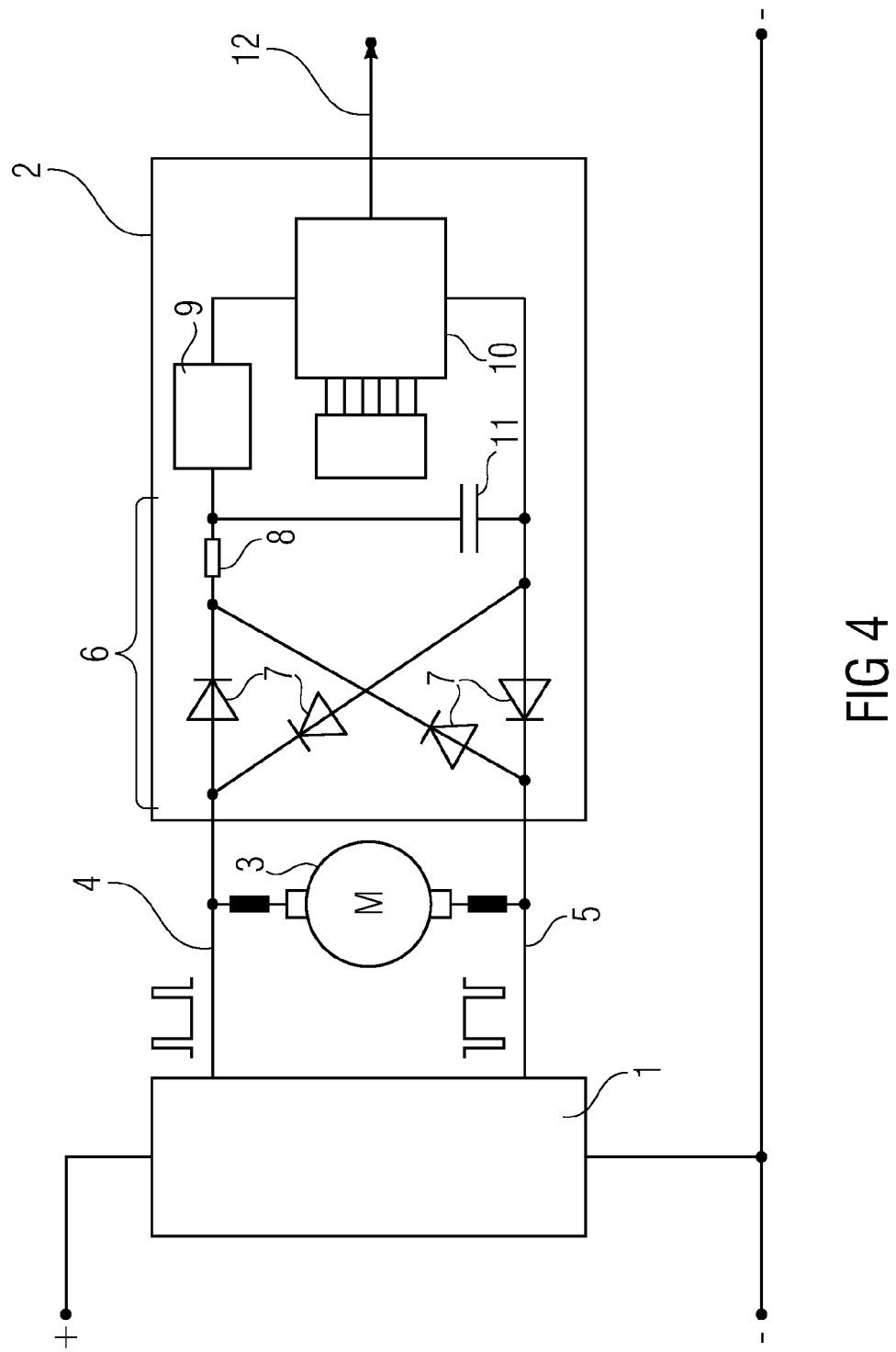
FIG. 4 shows a block diagram of a fourth specific embodiment of an actuator with a control unit and a position sensor.

FIG. 4 shows one specific embodiment similar to that of FIG. 3, but with an integrated storage capacitor 11.

All specific embodiments relate to a position sensor 10 with a voltage supply via the motor terminals and integration of the rectifier circuit into the IC housing of the sensor (integration in ASIC).

What is claimed is:

1. A position sensor for detecting a position of an actuator with an electric motor, the position sensor comprising:
   an evaluation circuit;
   a rectifier circuit; and
   additional filter components;
   wherein the evaluation circuit, the rectifier circuit, and the additional filter components are combined into an integrated circuit disposed in an IC housing; and
   wherein electrical energy for the evaluation circuit is drawn via control lines for the electric motor, rectified by the rectifier circuit, and filtered by the additional filter components.

2. The position sensor as claimed in claim 1, further comprising a storage capacitor combined with the evaluation circuit in the integrated circuit.

3. The position sensor as claimed in claim 1, further comprising a voltage regulator combined with the evaluation circuit into an integrated circuit.

4. The position sensor as claimed in claim 3, wherein the voltage regulator is integrated into the IC housing.

5. The position sensor as claimed in claim 1, further comprising a storage capacitor connected outside the integrated circuit.

6. The position sensor as claimed in claim 1, further comprising a ground shared with a bridge circuit of the control lines for the motor and the signal evaluation.

7. The position sensor as claimed in claim 1, wherein the output signals remain independent within an established range of values for a supply voltage of the position sensor.

8. The position sensor as claimed in claim 1, wherein the rectifier circuit comprises a bridge circuit.

9. The position sensor as claimed in claim 1, wherein the rectifier circuit comprises a half bridge.

10. The position sensor as claimed in claim 1, wherein the rectifier circuit comprises active transistors.

11. A control loop for an actuator, the control loop comprising:
   an electric motor driving the actuator;
   a control unit supplying a voltage to the electric motor through control lines;
   position sensor for detecting a position of an actuator with an electric motor, the position sensor comprising:
      an evaluation circuit;
      a rectifier circuit; and additional filter components;

wherein the evaluation circuit, the rectifier circuit, and the additional filter components are combined into an integrated circuit disposed in an IC housing; and wherein electrical energy for the evaluation circuit is drawn via the control lines for the electric motor, rectified by the rectifier circuit, and filtered by the additional filter components.

12. The position sensor as claimed in claim 11, further comprising a storage capacitor combined with the evaluation circuit in the integrated circuit.

13. The position sensor as claimed in claim 11, further comprising a voltage regulator combined with the evaluation circuit into an integrated circuit.

14. The position sensor as claimed in claim 13, wherein the voltage regulator is integrated into the IC housing.

15. The position sensor as claimed in claim 11, further comprising a storage capacitor connected outside the integrated circuit.

16. The position sensor as claimed in claim 11, further comprising a ground shared with a bridge circuit of the control lines for the motor and the signal evaluation.

17. The position sensor as claimed in claim 11, wherein the output signals remain independent within an established range of values for a supply voltage of the position sensor.

18. The position sensor as claimed in claim 11, wherein the rectifier circuit comprises a bridge circuit.

19. The position sensor as claimed in claim 11, wherein the rectifier circuit comprises a half bridge.

20. The position sensor as claimed in claim 11, wherein the rectifier circuit comprises active transistors.

* * * * *